(12) United States Patent
Ponting

(10) Patent No.: US 10,759,139 B2
(45) Date of Patent: Sep. 1, 2020

(54) MULTICOMPONENT LAYERED DIELECTRIC FILM AND USES THEREOF

(71) Applicant: POLYMERPLUS, LLC, Valley View, OH (US)

(72) Inventor: Michael T. Ponting, Valley View, OH (US)

(73) Assignee: POLYMERPLUS LLC, Valley View, OH (US)

( * ) Notice: Subject to any disclaimer, the term of this patent is extended or adjusted under 35 U.S.C. 154(b) by 0 days.

(21) Appl. No.: 15/760,148

(22) PCT Filed: Dec. 4, 2015

(86) PCT No.: PCT/US2015/064035
§ 371 (c)(1),
(2) Date: Mar. 14, 2018

(87) PCT Pub. No.: WO2017/048307
PCT Pub. Date: Mar. 23, 2017

(65) Prior Publication Data
US 2018/0257327 A1    Sep. 13, 2018

Related U.S. Application Data

(60) Provisional application No. 62/218,337, filed on Sep. 14, 2015.

(51) Int. Cl.
*H01G 4/14* (2006.01)
*H01G 4/18* (2006.01)
(Continued)

(52) U.S. Cl.
CPC ............ *B32B 3/14* (2013.01); *B32B 3/04* (2013.01); *B32B 3/18* (2013.01); *B32B 3/263* (2013.01);
(Continued)

(58) Field of Classification Search
CPC ............ H01G 4/14; H01G 4/18; H01G 4/20
See application file for complete search history.

(56) References Cited

U.S. PATENT DOCUMENTS 7,102,876 B2 * 9/2006 Lee .......................... H01G 4/20
361/312
7,323,634 B2    1/2008 Speakman
(Continued)

FOREIGN PATENT DOCUMENTS

CN    104245309 A    12/2014
JP    H08-207119 A    8/1996
(Continued)

OTHER PUBLICATIONS

Carr, et al., "Effect of Biaxial Orientation on Dielectric and Breakdown Properties of Poly(ethylene terephthalate)/Poly(vinylidene fluoride-co-tetrafluoroethylene) Multilayer Films", Journal of Polymer Science, Part B: Polymer Physics 2013, 51, 882-896.

(Continued)

*Primary Examiner* — Nathan Milakovich
(74) *Attorney, Agent, or Firm* — Tarolli, Sundheim, Covell & Tummino LLP

(57) ABSTRACT

A multicomponent dielectric film includes discrete overlapping dielectric layers of at least a first polymer material, a second polymer material, and a third polymer material. Adjoining dielectric layers define a generally planar interface therebetween which lies generally in an x-y plane of an x-y-z coordinate system. The interfaces between the layers delocalizing the charge build up in the layers. At least one dielectric layer including a stack of discrete polymer layers with polymer layer interfaces extending transverse to the x-y plane and optionally at least one filler having a higher dielectric constant than the first polymer material, the second polymer material, and/or the third polymer material.

20 Claims, 7 Drawing Sheets

(51) Int. Cl.
*H01G 4/20* (2006.01)
*B32B 3/14* (2006.01)
*B32B 27/08* (2006.01)
*B32B 27/30* (2006.01)
*B32B 27/36* (2006.01)
*B32B 3/04* (2006.01)
*B32B 3/18* (2006.01)
*B32B 3/26* (2006.01)
*B32B 7/00* (2019.01)
*H01G 4/30* (2006.01)
*B32B 27/28* (2006.01)
*B32B 27/32* (2006.01)
*H01G 4/32* (2006.01)
*B32B 27/20* (2006.01)
*H01G 4/12* (2006.01)
*H01G 4/10* (2006.01)

(52) U.S. Cl.
CPC ............... *B32B 7/00* (2013.01); *B32B 27/08* (2013.01); *B32B 27/20* (2013.01); *B32B 27/286* (2013.01); *B32B 27/304* (2013.01); *B32B 27/308* (2013.01); *B32B 27/32* (2013.01); *B32B 27/36* (2013.01); *B32B 27/365* (2013.01); *H01G 4/14* (2013.01); *H01G 4/18* (2013.01); *H01G 4/20* (2013.01); *H01G 4/206* (2013.01); *H01G 4/30* (2013.01); *H01G 4/32* (2013.01); *B32B 2250/05* (2013.01); *B32B 2255/10* (2013.01); *B32B 2255/205* (2013.01); *B32B 2262/10* (2013.01); *B32B 2262/106* (2013.01); *B32B 2264/102* (2013.01); *B32B 2264/108* (2013.01); *B32B 2264/12* (2013.01); *B32B 2270/00* (2013.01); *B32B 2307/202* (2013.01); *B32B 2307/204* (2013.01); *B32B 2307/514* (2013.01); *B32B 2307/732* (2013.01); *B32B 2457/16* (2013.01); *H01G 4/10* (2013.01); *H01G 4/1218* (2013.01); *H01G 4/1236* (2013.01)

(56) References Cited

U.S. PATENT DOCUMENTS

| | | | |
|---|---|---|---|
| 8,586,173 B2* | 11/2013 | Yializis | B05D 1/60 428/213 |
| 8,611,068 B2 | 12/2013 | Baer et al. | |
| 9,558,888 B2 | 1/2017 | Baer et al. | |
| 10,071,518 B2* | 9/2018 | Fork | B01F 5/0604 |
| 2009/0034156 A1 | 2/2009 | Yamamoto | |
| 2011/0287243 A1 | 11/2011 | Carney et al. | |
| 2014/0160623 A1* | 6/2014 | Baer | B32B 27/08 361/301.4 |
| 2015/0064413 A1 | 3/2015 | Baer et al. | |
| 2018/0040912 A1* | 2/2018 | Chang | H01M 10/02 |

FOREIGN PATENT DOCUMENTS

| | | |
|---|---|---|
| JP | H08-336884 A | 12/1996 |
| JP | 2008-229849 A | 10/2008 |
| JP | 2008-277734 A | 11/2008 |
| JP | 2010-192787 A | 9/2010 |
| JP | 2012-511446 A | 5/2012 |
| JP | 2013207202 | 10/2013 |
| JP | 2015-012076 A | 1/2015 |
| JP | 2015-199244 A | 11/2015 |
| WO | 2011/019408 A1 | 2/2011 |

OTHER PUBLICATIONS

Chinese Office action for Patent Application No. 201580083492.8, dated May 17, 2019.
Extended European Search Report for Application No. 15904295. 1-1204/3350818 PCT/US2015064035, dated Apr. 16, 2019.
Supplementary European Search Report for Application No. 15904295. 1-1204/3350818 PCT/US2015064035, dated May 6, 2019.
Office action for Japanese Patent Application No: 2018-533036, dated Dec. 3, 2019.

* cited by examiner

| Sample | Structure | Breakdown Strength (MV/m) | Losses |
|---|---|---|---|
| PVDF Control* | Monolayer | 380 ± 70 | -- |
| (PMMA-/PVDF)/PC (20/24)/56 | | 560 ± 115 | -- |
| (PMMA-/PVDF)/PC (10/27)/63 | | 510 ± 70 | 12% |
| PC/(PVDF+BaTiO3 1%) (90/10) | | 900 ± 100** | 6% (at 5 kV) (at 625 MV/m) |
| PC/PVDF* (90/10) | | 950 ± 100** | 12% (at 5 kV) (at 625 MV/m) |

* Control and horizontal layer films ** small test area compared to other samples

MULTICOMPONENT LAYERED DIELECTRIC FILM AND USES THEREOF

RELATED APPLICATION

This application claims priority from U.S. Provisional Application No. 62/218,337, filed Sep. 14, 2015, the subject matter of which is incorporated herein by reference in its entirety.

TECHNICAL FIELD

The present invention relates to multicomponent layered dielectric films and to their use in capacitors and other energy storing devices.

BACKGROUND

Capacitors employ thermoplastic dielectric thin film polymers, such as polypropylene (PP), polyethylene terephthalate (PET), polycarbonate, polyethylene-2,6-naphthalate, polyvinylidene difluoride (PVDF), polyphenylene oxide, polytetrafluoroethylene and polyphenylene sulfide, either metallized or maintained between metal foil electrodes. Metalized film capacitors are used extensively in a broad range of electrical and electronic equipment that include motor run and motor start circuits for air conditioners, fluorescent and high intensity light ballasts, power supplies, telecommunication equipment, instrumentation, and medical electronics. In many of these applications, the metallized capacitors are used to store energy.

U.S. Pat. No. 8,611,068 describes a multilayer coextrusion process of polymer materials for the production of dielectric films. The patent discloses dielectric multilayer polymer films comprising alternating layers of polymers with different dielectric properties creating interfaces between the layers that delocalizes the charge and improves the dielectric properties. The patent discloses using two or more polymers or blends thereof, miscible or immiscible, in multilayered films. Subsequent stretching of the films is also taught to improve the dielectric properties.

SUMMARY

Embodiments described herein relate to multicomponent layered dielectric films that can be used, for example, in capacitor or energy storage applications. The multicomponent layered dielectric film includes a plurality of discrete polymer layers that at least partially overlap to define discrete overlapping dielectric layers. The plurality of discrete polymer layers can include a first polymer layer, a second polymer layer, and a third polymer layer that define one, two, three or more of the discrete overlapping dielectric layers.

The multicomponent layered dielectric film can have a gradient layer structure or packets of layers with different individual layer thicknesses. The film can also contain multiple such packets with each packet of layers containing two or more layer thickness variations.

In some embodiments, the layer structure can be present with additional layers of same or different polymer(s) as outside layer(s). The outside layers can be added to provide improved dielectric properties, such as breakdown strength or dielectric constant.

In some embodiments, the multicomponent layered dielectric film can include a stack of the discrete overlapping dielectric layers. The stack of dielectric layers can include at least a first polymer material, a second polymer material, and a third polymer material. Adjoining dielectric layers of the stack can define a generally planar interface therebetween which lies generally in an x-y plane of an x-y-z coordinate system. At least one of the dielectric layers can include a stack of discrete polymer layers with polymer layer interfaces extending transverse to the x-y plane and optionally at least one non-polymeric filler having a higher dielectric constant than the first polymer material, the second polymer material, and/or the third polymer material. The interface between the dielectric layers can delocalize charge build up in the layers to provide enhanced breakdown strength and reduced loss compared prior art dielectric films.

In some embodiments, at least one of the dielectric layers can include about 1% to about 50% by volume of the non-polymeric filler or blend of two or more non-polymeric fillers or particle sizes. The non-polymeric filler can include at least one of particles, fibers, or other materials, such as $SrTiO_3$, $ZrO_2$, $HfO_2$, $Y2O_3$, $CaCu_3Ti_4O_{12}$, $LaAlO_3$, $BaTiO_3$, $SiO_2$, $TiO_2$, $La_2O_3$, $Al_2O_3$, carbon black, graphene, or carbon nanotubes or their modifications.

In other embodiments, at least one of the dielectric layers can include a blend or mixture of two or more polymers. The two or more polymers can be substantially miscible with each other to allow extrusion of the polymer mixture or blend.

In some embodiments, the multicomponent dielectric film can include about 2 to about 500,000 alternating first dielectric layers and second dielectric layers fabricated by multilayer coextrusion forced assembly processes.

In some embodiments, a first dielectric layer formed from the first polymer material and the second polymer material can have a permittivity greater than a second dielectric layer formed from the third polymer material. In other embodiments, a second dielectric layer formed from the third polymer material can have a greater breakdown strength and a first dielectric layer formed from the first polymer material and the second polymer material.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Embodiments described herein relate to multicomponent layered dielectric films and to capacitors or other energy storage devices that include the multicomponent layered dielectric films. The capacitors can be fabricated by stacking or winding the multicomponent layered dielectric film with electrodes.

The multicomponent layered dielectric film includes a plurality of discrete polymer layers that at least partially overlap to define discrete overlapping dielectric layers. The plurality of discrete polymer layers can include a first polymer layer, a second polymer layer, a third polymer layer or additional polymer layers that define one, two, three or more of the discrete overlapping dielectric layers.

In some embodiments, the multicomponent layered dielectric film can include a stack of the discrete overlapping dielectric layers. The stack of dielectric layers can include at least a first polymer material, a second polymer material, and a third polymer material. Adjoining dielectric layers of the stack can define a generally planar interface therebetween, which lies generally in an x-y plane of an x-y-z coordinate system. At least one of the dielectric layers can include a stack of discrete polymer layers with polymer layer interfaces extending transverse to the x-y plane and optionally at least one non-polymeric filler having a higher dielectric constant than the first polymer material, the second polymer material, and/or the third polymer material. The interface between the dielectric layers can delocalize charge build up in the layers to provide enhanced breakdown strength and reduced loss compared prior art dielectric films.

In other embodiments, the multicomponent layered dielectric film can have a gradient layer structure or packets of layers with different individual layer thicknesses. The film can also contain multiple such packets with each packet of layers containing two or more layer thickness variations. The layer structure can be present with additional layers of same or different polymer(s) as outside layer(s). The outside layers can be added to provide improved dielectric properties, such as breakdown strength or dielectric constant.

Figure 1:
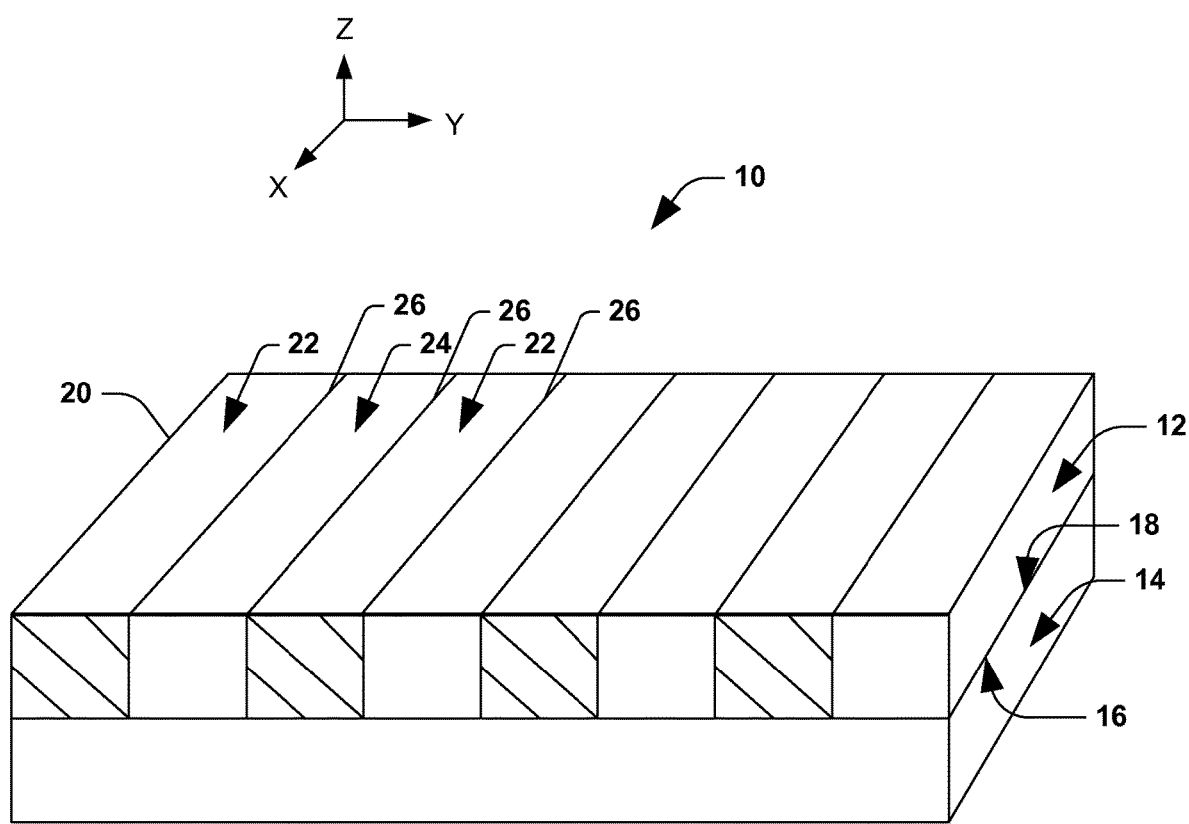
FIG. 1 is a schematic illustration of a multicomponent layered dielectric film in accordance with an embodiment.

Referring to FIG. 1, the multicomponent layered dielectric film 10 includes a first dielectric layer 12 of a first polymer material and second polymer material and a second dielectric layer 14 of a third polymer material. Adjoining surfaces 16 and 18 of the first dielectric layer 12 and second dielectric layer 14 define a generally planar interface therebetween which lies generally in an x-y plane of an x-y-z coordinate system. For example, the first dielectric layer 12 and second dielectric layer 14 can be stacked vertically such that adjoining surfaces of the first dielectric layer 12 and second dielectric layer 14 define a horizontal planar interface between the adjoining layers 12 and 14. The first dielectric layer 12 can include a stack of discrete polymer layers with polymer layer interfaces extending transverse to the x-y plane or horizontal to the vertical stack defined by first dielectric layer 12 and second dielectric layer 14.

In some embodiments, the stack of discrete polymer layers 20 can include alternating first polymer layers 22 and second polymer layers 24 of the first polymer material and second polymer material. The first polymer material of the first polymer layers 22 and the second polymer material of the second polymer layers 24 can have different compositions or be formed from different polymers. Adjoining first polymer layers 22 and second polymer layers 24 of the stack can define a generally planar interface 26 therebetween. While the polymer layer interfaces 26 are illustrated as extending substantially perpendicular to the x-y plane, it will be appreciate that they can have other configurations.

The polymer materials used to form the first dielectric layer 12 and the second dielectric layer 14 can include polymers with desirable dielectric properties and with insulating properties that act as a barrier to electrical breakdown. In one example, the third polymer material and/or the second polymer material formed into the first dielectric layer 12 can be chosen to have a high permittivity (e.g., greater than the permittivity of the second polymer material) but it need not have a high dielectric strength. The third polymer material formed into the second dielectric layer can be chosen to have a high breakdown strength (e.g., greater than the breakdown strength of the first polymer material and/or second polymer material). The interfaces between the first dielectric layer(s) and second dielectric layer(s) can delocalize charge build up in the layers to provide enhanced breakdown strength and reduced loss compared prior art dielectric films.

Figure 2:
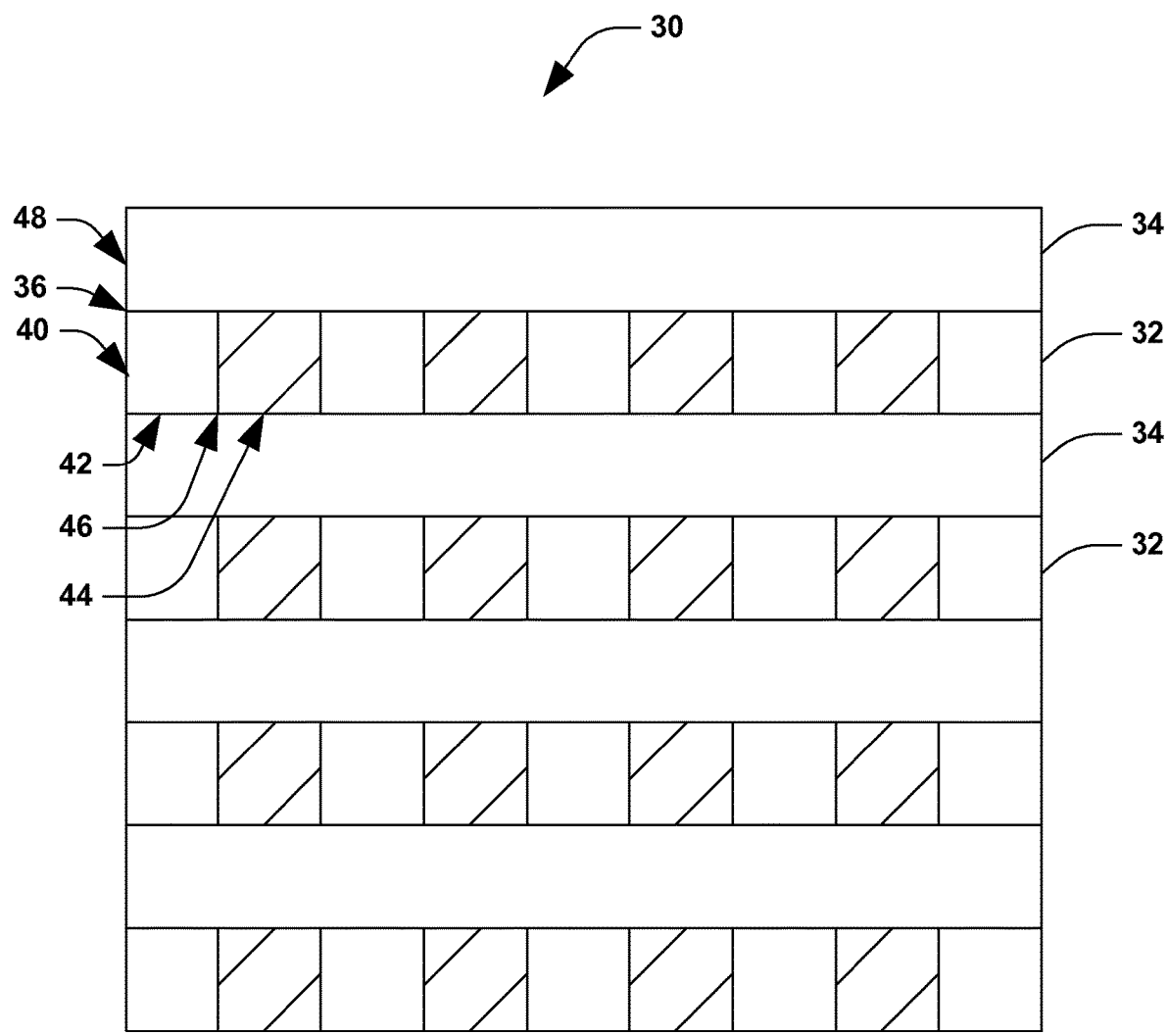
FIG. 2 is a schematic illustration of a multicomponent layered dielectric film in accordance with another embodiment.

FIG. 2 illustrates a multicomponent layered dielectric film 30 that includes a plurality of alternating first dielectric layers 32 and second dielectric layers 34 of the first polymer material, the second polymer material, and the third polymer material. The first dielectric layers 32 and the second dielectric layers 34 can be substantially parallel and vertically stacked so that each first dielectric layer 32 is adjacent to at least one of the second dielectric layers 34 and defines an interface 36 between each layer. The first dielectric layers 32 can include a horizontal stack 40 of first polymer layers 42 and second polymer layers 44 with interfaces 46 perpendicular or transverse to the interface 36 of the dielectric layers. The second dielectric layers 34 can be defined by third polymer layers 48. Each interface 36 of the dielectric layers 32 and 34 and/or the combination of interfaces 36 of the dielectric layers 32 and 34 can delocalize charge build up in the layers 32 and 34 and the multicomponent film 30.

Figures 7, 8:
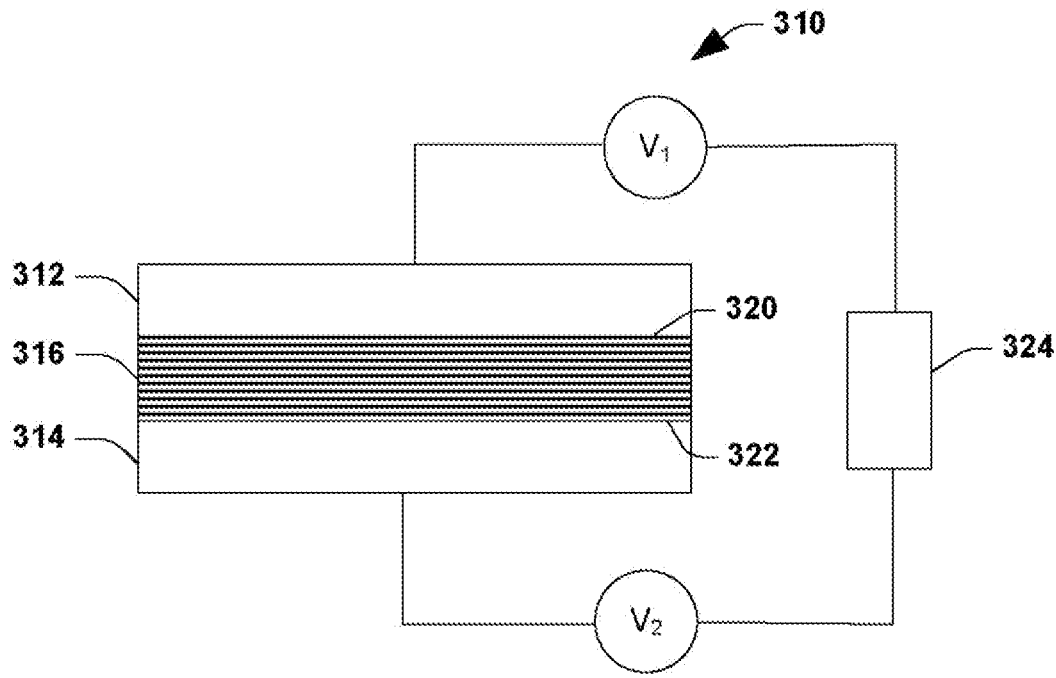
FIG. 7 is a schematic illustration of a capacitor in accordance with an embodiment.
FIG. 8 is a table showing different multicomponent layered dielectric films in accordance with embodiments described herein and their breakdown strength and losses.

The first dielectric layers 32 and the second dielectric layers 34 as well as first polymer layers 42, the second polymer layers 44, and third polymer layers 48 can have various thicknesses, for example, about 5 to about 5000 nm that can be readily varied to adjust electric properties of the multicomponent layered dielectric film. When employed as a film 316 in a capacitor as shown in FIG. 7, the first dielectric layer(s) and second dielectric layer(s) are perpendicular to the electrical field thus maximizing the breakdown field or strength of the film 316 by maximizing the barrier to electrical breakdown propagation presented by the polymer materials. Since the maximum stored energy density of dielectric materials is proportional to the effective permittivity times the square of the dielectric strength, the maximum stored energy density of the multicomponent layered dielectric film can substantially exceed that of either of the component polymers in their pure state.

Figure 3:
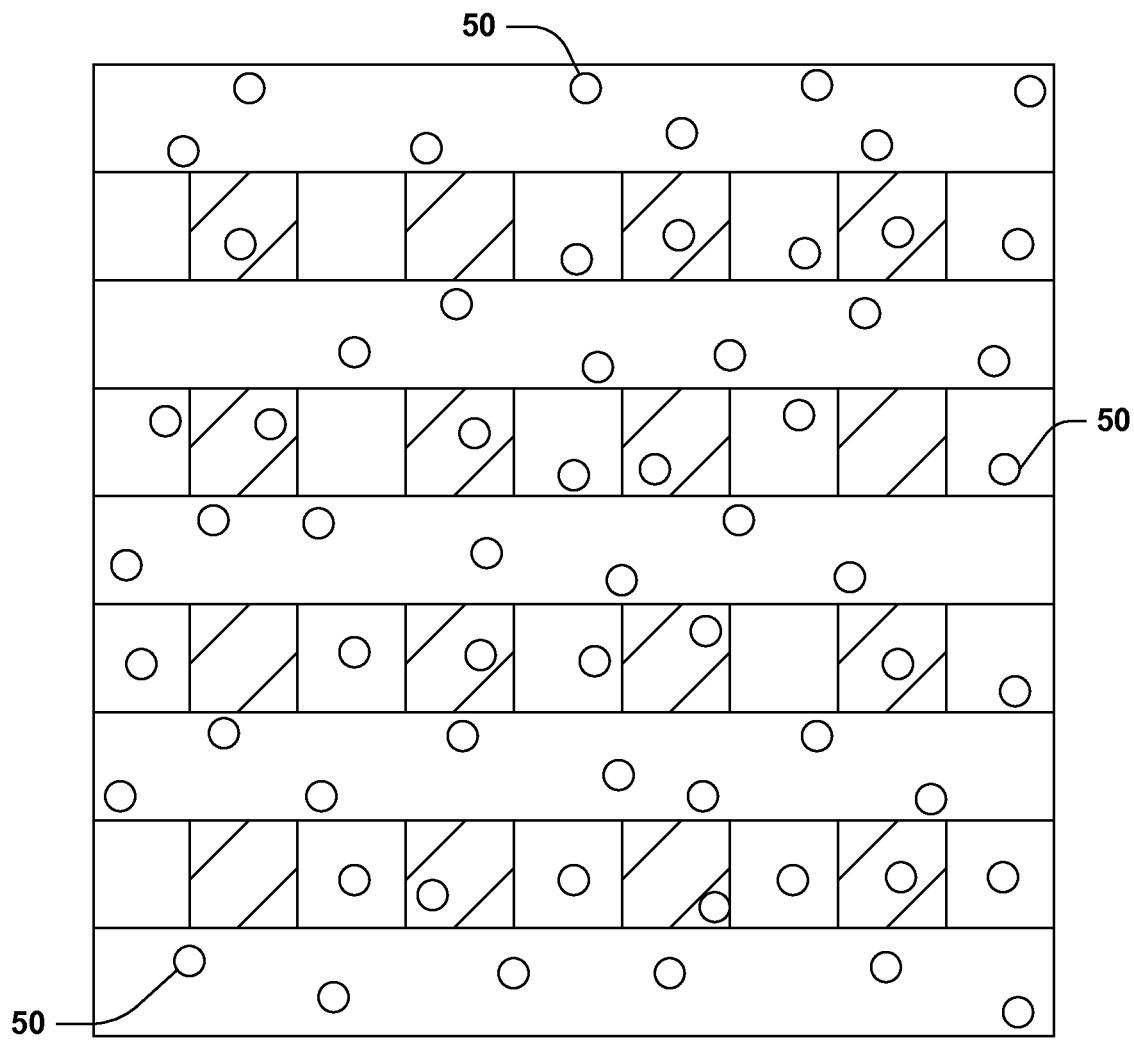
FIG. 3 is a schematic illustration of a multicomponent layered dielectric film in accordance with another embodiment.

Optionally, as shown in FIG. 3, the first dielectric layer, the second, and/or the third dielectric layer can include one of more additives 50 to improve the stored energy density, break down, and/or permittivity of the multilayer polymer dielectric film. For example, the first dielectric layer and/or the second dielectric layer can include about 1% to about 50% by volume of a non-polymeric filler or blend of two or more non-polymeric fillers or particle sizes to improve dielectric properties (i.e., discharge resistance, breakdown strength, and permittivity) of the host polymer. The non-polymeric filler can include particle, fibers, or other fillers such as metal oxide particles, including $SrTiO_3$, $ZrO_2$, $HfO_2$, $Y_2O_3$, $CaCu_3Ti_4O_{12}$, $LaAlO_3$, $BaTiO_3$, $SiO_2$, $TiO_2$, $La_2O_3$, $Al_2O_3$, carbon black, graphene, and/or carbon nanotubes and their modifications.

The first polymer material, the second polymer material, and the third polymer material can be selected so that the stored energy density and break down strength of the film 30 is maximized. In an aspect of the invention, the first polymer material and/or second polymer material used to form the first dielectric layers can comprise a thermoplastic polymer, such as glassy, crystalline or elastomeric material, that has a high permittivity (e.g., permittivity greater than the third polymer material). The first polymer material and/or second polymer material can comprise a single polymer, a composite polymer material, or a blend of polymers. In an aspect of the invention, the stored energy density and the permittivity can be substantially greater than the stored energy density and permittivity of the third polymer material.

In another aspect, the third polymer material can comprise a thermoplastic, such as glassy, crystalline or elastomeric material, that has a high breakdown strength (e.g., breakdown strength higher than the first polymer material and/or the second polymer material). The third polymer material can comprise a single polymer, a composite polymer material, or a blend of polymers. In one aspect of the invention, the breakdown strength of the third polymer material can be substantially greater than the breakdown strength of the first polymer material and/or second polymer material and this can give the multicomponent film a higher maximum stored energy density and breakdown strength than either of the pure component polymers.

In another aspect, the layer structure can constitute thickness variation along the Z-direction of the layer stack. The film can constitute a gradient layer structure or packets of layers with different individual layer thicknesses. The film can also contain multiple such packets with each packet of layers containing two or more layer thickness variations.

In another aspect, the layer structure can be present with additional layers of same or different polymer(s) as outside layer(s). The outside layers can be added to provide improved dielectric properties, such as breakdown strength or dielectric constant. The core layer structure can constitute any of the layer structure morphologies described herein or a single layer constituting one or more polymers and/or fillers discussed herein.

In another aspect, the multicomponent film structure can be treated with other techniques such as cross-linking (gamma radiation), curing or imbibing with other molecules to further improve the performance, such as breakdown strength.

One of ordinary skill in the art will readily appreciate that a wide variety of thermoplastic polymeric materials can be used to form the first layers and second layers of the multicomponent layered dielectric film of the present invention. Such materials include, but are not limited to glassy polymers, crystalline polymers, and elastomers.

The term "polymer" or "polymeric material" as used in the present application denotes a material having a weight average molecular weight (Mw) of at least 5,000. Preferably, the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Examples of polymeric materials that can be used to form the first dielectric layer and second dielectric layer of the multicomponent layered dielectric film include maleic anhydride-modified polypropylene (PPgMA); polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly (isobutyl methacrylate), poly(propyl methacrylate), poly (ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly (4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. The dielectric layers can also be formed from copolymers such as, styrene-acrylonitrile copolymer (SAN), for example, containing between 10 and 50 wt %, preferably between 20 and 40 wt %, acrylonitrile, styrene-ethylene copolymer; and poly(ethylene-1,4-cyclohexylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers, PLA, COCs, ETFE, and PFA.

In addition, each individual layer can include blends of two or more of the above-described polymers or copolymers. The components of the blend can be substantially miscible or immiscible.

In one example, the first dielectric layer(s) can be formed from a stack of first polymer layers and second polymer layers that have a high permittivity, such as polyvinylidene fluoride (PVDF) or a copolymer thereof, such as poly (vinylidene fluoride-co-hexafluoropropylene) (P(VDF-HFP)) and poly(methyl methacrylate) (PMMA) or composites thereof. The second dielectric layers can be formed from third polymer layers of polypropylene (PP), polyethylene teraphthalate (PET), polycarbonate (PC), poly(p-phenylene sulfide), copolymers thereof, or composites thereof.

The multicomponent layered dielectric film can include, for example, about 1% to about 99% by weight of a combination of the first polymer material and second polymer material and about 1% to about 99% by weight of the third polymer material. The weight ratio or weight percent of the first polymer material to the second polymer material and/or the third polymer material in the multicomponent layered dielectric film can be adjusted by altering the thicknesses of the first dielectric layer and/or the second dielectric layer to tailor the dielectric and energy density properties of the film. Additionally, the weight ratio or weight percent of the polymers used to form the first polymer layers, the second polymer layers, and/or the third polymer layers can be adjusted by altering the thicknesses of the first polymer layers, second polymer layers, and/or third polymer layers to tailor the dielectric and energy density properties of the film.

It will be understood, however, that a specific constituent or concentration of the first polymer material, the second polymer material, the third polymer material or any constituent in a multicomponent layered dielectric film described herein can be adjusted so as to tailor the properties of polymeric dielectrics for different applications. For an implantable defibrillator, for example, high energy density is required as well as high breakdown voltages. In that instance, it is necessary to maximize the PVDF and PMMA content for the energy requirement and to balance it accordingly with PC to stabilize the poor electrical properties of PVDF and PMMA. However, to obtain some desired property(ies) other than simply energy density, it may be necessary to reduce the concentration of PVDF and PMMA.

The multicomponent layered dielectric film includes at least two discrete dielectric layers (i.e., the first dielectric layer and the second dielectric layer), for example, at least 10 dielectric layers alternating between the first dielectric layer and the second dielectric layer. The number of layers in the multicomponent layered dielectric film is preferably in the range of from about 2 to about 100,000 and more preferably from about 10 to about 10,000, including any increments within these ranges. The multicomponent layered dielectric film can include up to about 500,000 layers alternating between the first layer and the second layer.

The vertical dielectric layers of the multicomponent layered dielectric film can have thicknesses in the range of, for example, about 5 nanometers (nm) to about 1,000 micrometers ($\mu m$). The thicknesses of the first dielectric layer(s) and the second dielectric layer(s) are such that the final a multicomponent layered dielectric film can have a hierarchical structure or gradient structure on the nanometer, the micrometer and the centimeter scale. The number of first dielectric layers and second dielectric layers employed in the multicomponent layered dielectric film as well as the thicknesses of each of the layer can be selected so that the energy density and breakdown strength of the film is maximized.

The horizontal polymer layers of the dielectric layers can have thicknesses in the range of, for example, about 5 nanometers (nm) to about 500 micrometers ($\mu m$). The thicknesses of the first polymer layer(s) and the second polymer layer(s) are such that the final a multicomponent layered dielectric film can have a hierarchical structure on the nanometer, the micrometer and the centimeter scale. The number of horizontal polymer layers in each dielectric layer as well as the thicknesses of each of the polymer layer can be selected so that the energy density and breakdown strength of the film is maximized.

The multilayer dielectric film can also include other polymer layers besides the first dielectric layer(s) and the second dielectric layer(s). These other dielectric layers can be interspersed with the first dielectric layers and the second dielectric layers to modify the stored energy density, breakdown, and permittivity. In one example, the first layer (A), the second layer (B), and the addition (i.e., third) layer can be alternated so that the multicomponent layered dielectric film has a three component structure of alternating layers (ABCABCABC . . . ) or (ABC)$_x$, where x is at least 5. It will be appreciated that the first layer, second layer, and third layer can be provided any number of different component layers such as (CACBCACBC . . . ).

Figure 4:
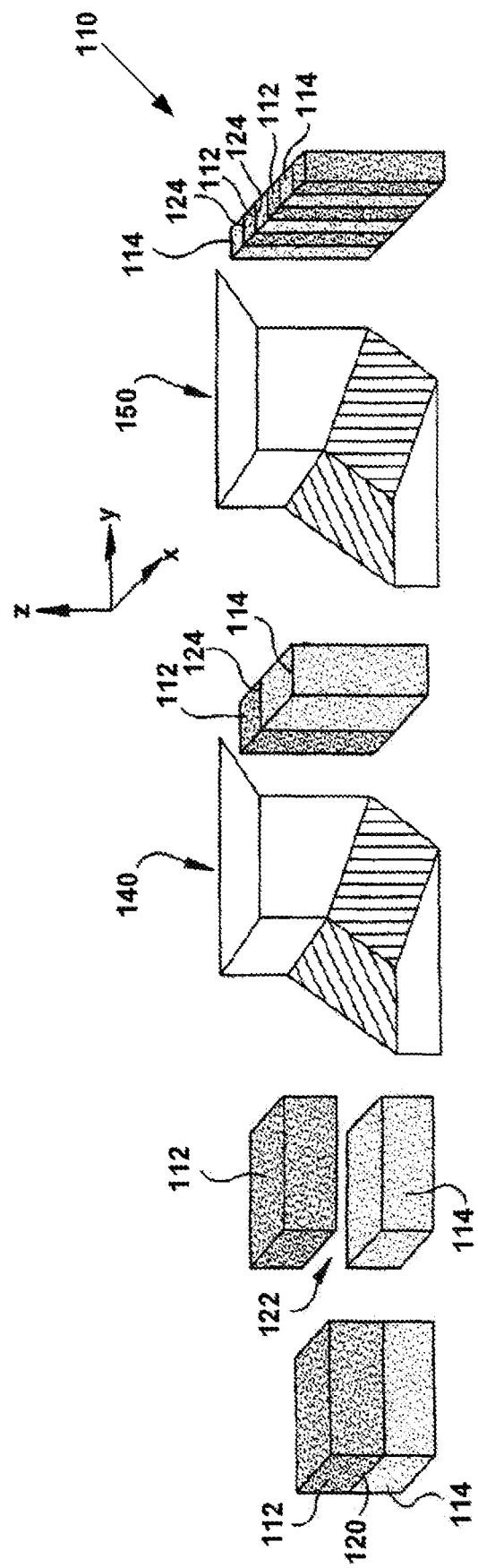
FIG. 4 is a schematic illustration of a co-extrusion and layer multiplying process used to form a multicomponent layered dielectric film in accordance with an embodiment.

In some embodiments as illustrated in FIG. 4, the multicomponent dielectric film can be prepared by coextruding the first polymer material, the second polymer material, and the third polymer material to form overlapping first polymer layers, second polymer layer, and third polymer layers. The first polymer material, the second polymer material, and the third polymer material can be substantially immiscible during co-extrusion to define discrete or separate layers.

The overlapping layers can be multiplied to form first dielectric layers of horizontal stacks of the first polymer layers and second polymer layers interspersed between second dielectric layers of the third polymer material. In some embodiments, multiplying the overlapping layers comprises vertical layer multiplication of the overlapping first polymer layer and second polymer layer by cutting the flow horizontally of the overlapping layers through a die, surface layering the overlapping polymers layers on a top and bottom surface of vertical layers formed by the vertical layer multiplication, and horizontal layer multiplication of the surface layered vertical layers to stack one side portion of the surface layered vertical stack on a second side portion. In some embodiments, the vertical layer multiplication is repeated eight times to yield vertical layers composed of 1024 alternating 512 layers of the first layer and 512 layers of second layer.

FIG. 4 illustrates a co-extrusion and multiplying process used to form a multicomponent layer dielectric film 110. First, a first polymer layer 112 and a second polymer layer 114 are provided. The first layer 112 is formed from a first polymer material (a) and the second polymer layer 14 is formed from a second polymer material (b). The second polymer material (b) can be substantially immiscible and have a similar viscosity with the first material (a) when co-extruded. It will be appreciated that one or more additional layers formed from the polymer materials (a) or (b) or a different polymer materials may be provided to produce the multicomponent layered dielectric film 110.

Figure 5:
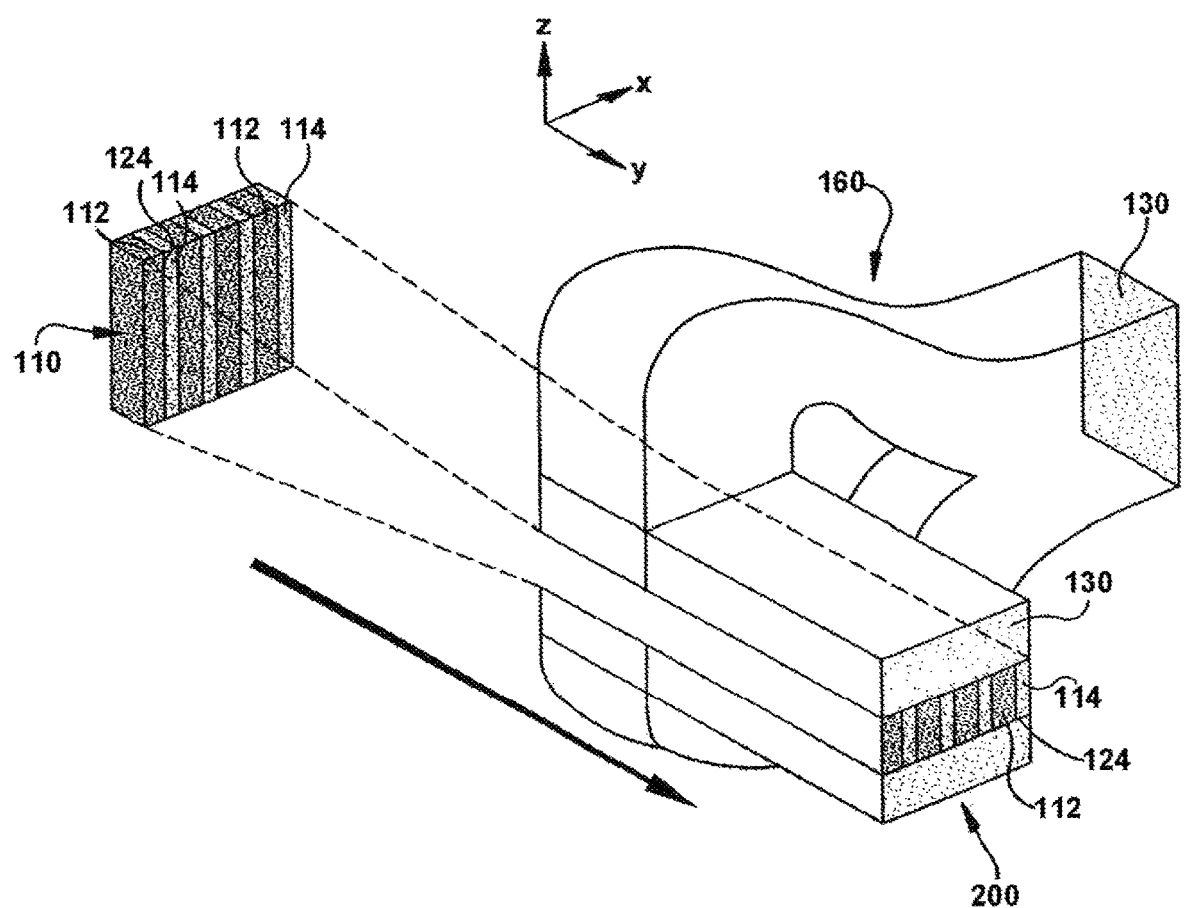
FIG. 5 is a schematic illustration of coextruding skin layers onto the composite film of FIG. 4 to form a composite stream.

Referring to FIG. 5, the layers 112, 114 are co-extruded and multiplied in order to form the multilayered polymer composite film 110. In particular, a pair of dies 140, 150 is used to co-extrude and multiply the layers 112, 114. Each layer 112, 114 initially extends in the y-direction of an x-y-z coordinate system. The y-direction defines the length of the layers 12, 14 and extends in the general direction of flow of material through the dies 140, 150. The x-direction extends transverse, e.g., perpendicular, to the y-direction and defines the width of the layers 112, 114. The z-direction extends transverse, e.g., perpendicular, to both the x-direction and the y-direction and defines the height or thickness of the layers 112, 114.

The layers 112, 114 are initially stacked in the z-direction and define an interface 120 therebetween that resides in the x-y plane. As the layers 112, 114 approach the first die 140 they are separated from one another along the z-axis to define a space 122 therebetween. The layers 112, 114 are then re-oriented as they pass through the first die 140. More specifically, the first die 140 varies the aspect ratio of each layer 112, 114 such that the layers 112, 114 extend longitudinally in the z-direction. The layers 112, 114 are also brought closer to one another until they engage or abut one another along an interface 124 that resides in the y-z plane.

The layers 112, 114 then enter the second die 150 where layer multiplication occurs. The second die 150 may constitute a single die or several dies which process the layers 112, 114 in succession (not shown). Each layer 112, 114 is multiplied in the second die 150 to produce a plurality of first layers 112 and a plurality of second layers 114 that alternate with one another to form the multilayered polymer composite film 10. Each pair of layers 112, 14 includes the interface 124 that resides in the y-z plane. The layers 112, 114 are connected to one another generally along the x-axis to form a series of discrete, alternating layers 112, 114 of polymer material (a), (b). Although three of each layer 112 and 114 are illustrated it will be appreciated that the multi-layered polymer composite film 110 may include, for example, up to thousands of each layer 112, 114.

Figure 6:
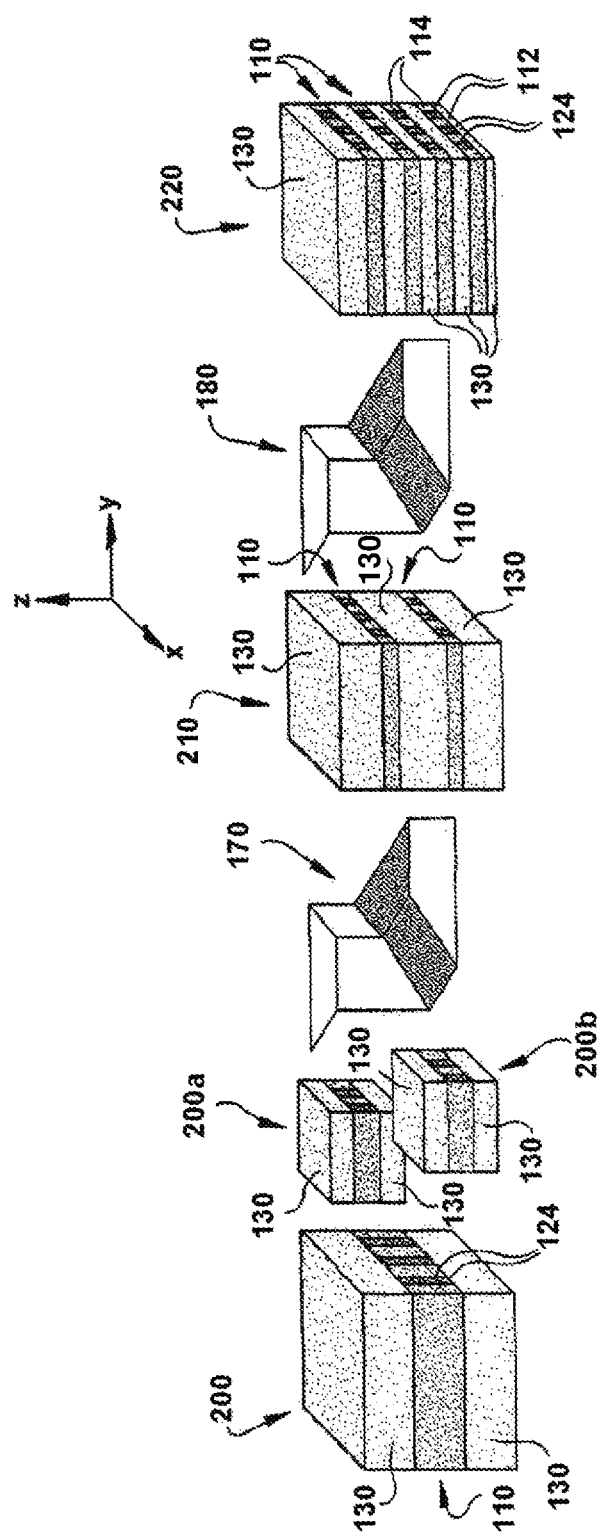
FIG. 6 is a schematic illustration of additional layer multiplying steps for the composite stream of FIG. 5.

Referring to FIG. 6, once the multilayered polymer composite film 110 is formed an outer layer 10 is applied to the top and bottom of the film 110 such that the film 110 enters a die 160 where the film 110 is sandwiched between two outer layers 130 along the z-axis to form a first composite stream 200. The outer layer 130 may be formed from the polymer material (a), the polymer material (b) or a polymer material (c) different from the polymer material (a) and material (b).

Referring to FIG. 6, the first composite stream 200 is divided along the x-axis into a plurality of branch streams 200a, 200b and processed through a pair of multiplying dies 170, 180. In the die 170, the streams 200a, 200b are stacked in the z-direction, stretched in both the x-direction and the y-direction, and recombined to form a second composite stream 210 that includes a plurality of dielectric alternating polymer layers 210 alternating with outer dielectric layers 130. Biaxial stretching of the branch streams 200a, 200b in the x-direction and y-direction may be symmetric or asymmetric.

The die 180 performs similar modifications to the second composite stream 210 that the die 170 performed on the branch streams 200a, 200b. In particular, in the die 180 the second composite stream 210 is divided along the x-axis, stacked along the z-axis, stretched in both the x-direction and the y-direction, and stacked in the z-direction to form a third composite stream 220. The third composite stream 220 shown in FIG. 3 includes four multilayered dielectric films 10 that alternate with five outer dielectric layers 130, although more or fewer of the films 110 and/or layers 130 may be present in the third composite stream 220. Regardless, the third composite stream 220 includes a plurality of layer interfaces 124 between the layers 112, 114.

By changing the volumetric flow rate of the polymer layers 112, 114 through the dies 170, 180, the thickness of both the polymer layers 112, 114 and each multilayered dielectric film 110 in the z-direction can be precisely controlled.

In some embodiments a first surface and an opposite second surface of the multicomponent dielectric film so formed can be metalized with a first layer and a second layer of an appropriate metal, such as aluminum, to form a first electrode and a second electrode. The first metal layer and second metal layer can have thicknesses of about 5 nm to about 500 nm and be formed, for example, by conventional metallization techniques.

In another embodiment, the dielectric properties of the multicomponent layered dielectric film can be varied mechanically by axially orienting (e.g., stretching), pressure, tension, compression or shear stresses or a combination of these stresses. As pointed out above, the composite can be fabricated so that one or both of the component polymers is an elastomer. Axial orientation of the multicomponent layered dielectric film in at least one direction parallel to the surface of the film can in some instances increase or improve the breakdown strength of the film. In one example, the multicomponent layered dielectric film can be biaxially oriented by stretching the film in a plane that is substantially parallel to a surface of the film at a draw ratio effective to increase the breakdown strength of the film. The draw ratio of the biaxially oriented multilayer polymer dielectric film can be about 1:1 to about 5:5. It will be appreciated that although the film can be biaxially oriented by stretching the film in at least two directions, the film can also be stretched in a single direction (e.g., uniaxially oriented) or stretched in multiple directions (e.g., triaxially oriented).

A number of designs of the multicomponent layered dielectric film are possible by choosing the appropriate initial materials and tailoring the polymer material, number of layers of the polymer materials, and thicknesses of the layers.

Very thin metalized film capacitors can be designed with this multilayer technique to enable achieving a device with stable dielectric constant and, hence, stable capacitance with voltage, improved insulation resistance and clearing or self-healing ability, lower leakage currents, and higher voltage breakdowns (compared, for example, with homopolymer PVDF), with the potential for unprecedented energy density from a bulk capacitor system. The markedly higher performance values (energy density, reliability, weight) is anticipated to be matched by markedly lower cost per unit of performance when volume manufacturing is employed. The methodology of the invention is well suited for the production of the implantable defibrillator, for example, and in many other high pulse power applications where energy density is afforded a premium.

The multicomponent layered dielectric film offers high dielectric constant, improved stability, improved dissipation factor, improved clearing ability, and high breakdown voltage, which allows it to be well suited for capacitor applications. For example, FIG. 7 illustrates a schematic view of a capacitor 310 in accordance with an embodiment of the application. The capacitor 310 includes a first electrode 312, a second electrode 314, and a multicomponent layered dielectric film 316. The multicomponent layered dielectric film 316 includes a first surface 320 and second surface 322 that is separated from and substantially parallel to the first surface 320. The multicomponent layered dielectric film is sandwiched between the first electrode 312 and the second electrode 314 such that the first electrode 312 is provided on and in contact with the first surface 320 and the second electrode 14 is provided on and in contact with the second surface 322. The first electrode 312 can be coupled to first power source, and the second electrode 14 can be coupled to a second power source 302. The first source $V_1$ and the second power source $V_2$ can be coupled to a voltage source 324 that is capable of applying varying bias voltages to the electrodes 312 and 314.

Although this film is particularly well suited for film capacitor applications, it is also useful in electrical cables, magnetic tapes, optical films for security and other purposes, piezoelectric sensors, and food packaging, to name a few other applications.

This invention is further illustrated by the following example, which should not be construed as limiting. The contents of all references, patent applications, patents, and published patent applications cited throughout this application are hereby incorporated by reference.

EXAMPLE

In this Example, films with different geometric structures were fabricated to evaluate the dielectric properties. Films with fillers in alternating layers and film structures with combination of vertical and horizontal layers were produced to demonstrate the improved dielectric properties. For example, multicomponent films containing layers of PVDF/

PC with 1 and 2 wt % BaTiO$_3$ fillers in PVDF layers demonstrated improved breakdown strength over control films and low losses compared to horizontal layer film. The breakdown strength of each film was measured using a 20 kV quadtech HiPot tester with a 500 V/S ramp. In another example, multicomponent films with PVDF/PMMA vertical layers coextruded with PVDF horizontal layers also showed improved dielectric properties as compared to control PVDF as shown in FIG. 8.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. The multilayer polymer dielectric film is primarily intended to be used in film capacitors for devices, such as defibrillators, vehicle power systems, pulsed power application, drilling systems, etc, but it could be used anywhere where higher operating temperatures, higher efficiency, faster charge time, and larger number of charge-discharge cycles are desired compared to conventional film capacitors and batteries.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, the following is claimed:

1. A multicomponent dielectric film comprising overlapping dielectric layers, the overlapping dielectric layers including at least a first polymer material, a second polymer material, and a third polymer material, adjoining dielectric layers of the overlapping dielectric layers defining generally planar interfaces therebetween which lie generally in an x-y plane of an x-y-z coordinate system, the generally planar interfaces between the adjoining dielectric layers delocalizing charge build up in the overlapping dielectric layers, at least one of the overlapping dielectric layers including a stack of discrete polymer layers with polymer layer interfaces extending transverse to the x-y plane, and optionally at least one non-polymeric filler having a higher dielectric constant than the first polymer material, the second polymer material, or the third polymer material.

2. The multicomponent dielectric film of claim 1, wherein the at least one of the overlapping dielectric layers includes about 1% to about 50% by volume of the at least one non-polymeric filler.

3. The multicomponent dielectric film of claim 2, wherein the at least one non-polymeric filler comprises at least one of particles, fibers, or materials including at least one of SrTiO$_3$, ZrO$_2$, HfO$_2$, Y$_2$O$_3$, CaCu$_3$Ti$_4$O$_{12}$, LaAlO$_3$, BaTiO$_3$, SiO$_2$, TiO$_2$, La$_2$O$_3$, Al$_2$O$_3$, carbon black, or carbon nanotubes.

4. The multicomponent dielectric film of claim 1, wherein the at least one of the overlapping dielectric layers includes a blend of two or more polymers.

5. The multicomponent dielectric film of claim 1, wherein the stack of discrete polymer layers with polymer layer interfaces includes alternating first polymer layers and second polymer layers, adjoining first polymer layers and second polymer layers of the stack of discrete polymer layers defining generally planar interfaces therebetween.

6. The multicomponent dielectric film of claim 5, wherein the polymer layer interfaces in the stack of discrete polymer layers extend substantially perpendicular to the x-y plane.

7. The multicomponent dielectric film of claim 5, wherein the first polymer layers and second polymer layers have different compositions.

8. The multicomponent dielectric film of claim 5, wherein the first polymer layers or the second polymer layers exhibit a gradient in layer thickness.

9. The multicomponent dielectric film of claim 1, wherein the overlapping dielectric layers comprise about 2 to about 500,000 alternating first dielectric layers and second dielectric layers.

10. The multicomponent dielectric film of claim 1, wherein the overlapping dielectric layers comprise a stack of alternating first dielectric layers and second dielectric layers fabricated by multilayer coextrusion forced assembly processes.

11. The multicomponent dielectric film of claim 1, the first polymer material or second polymer material having a permittivity greater than the third polymer material, and the third polymer material having a breakdown strength greater than the first polymer material and/or the second polymer material.

12. The multicomponent dielectric film of claim 1 being axially oriented in at least one direction substantially parallel to a surface of the multicomponent dielectric film at a draw ratio effective to increase the breakdown strength of the multicomponent dielectric film.

13. An energy storage device comprising a multicomponent dielectric film, the multicomponent dielectric film including a stack of discrete overlapping dielectric layers, the overlapping dielectric layers including at least a first polymer material, a second polymer material, and a third polymer material, adjoining dielectric layers of the overlapping dielectric layers defining generally planar interfaces therebetween which lie generally in an x-y plane of an x-y-z coordinate system, the generally planar interfaces between the adjoining dielectric layers delocalizing charge build up in the overlapping dielectric layers, at least one of the overlapping dielectric layers including a stack of discrete polymer layers with polymer layer interfaces extending transverse to the x-y plane, and optionally at least one non-polymeric filler having a higher dielectric constant than the first polymer material, the second polymer material, or the third polymer material.

14. The energy storage device of claim 13, wherein the at least one of the overlapping dielectric layers includes about 1% to about 50% by volume of the at least one non-polymeric filler.

15. The energy storage device of claim 14, wherein the at least one non-polymeric filler comprises at least one of particles, fibers, or materials including at least one of SrTiO$_3$, ZrO$_2$, HfO$_2$, Y$_2$O$_3$, CaCu$_3$Ti$_4$O$_{12}$, LaAlO$_3$, BaTiO$_3$, SiO$_2$, TiO$_2$, La$_2$O$_3$, Al$_2$O$_3$, carbon black, graphene, or carbon nanotubes.

16. The energy storage device of claim 13, wherein the at least one of the overlapping dielectric layers includes a blend of two or more polymers.

17. The energy storage device of claim 13, wherein the stack of discrete polymer layers with polymer interfaces includes alternating first polymer layers and second polymer layers, adjoining first polymer layers and second polymer layers of the stack of discrete polymer layers defining generally planar interfaces therebetween.

18. The energy storage device of claim 17, wherein the polymer layer interfaces in the stack of discrete polymer layers extend substantially perpendicular to the x-y plane.

19. The energy storage device of claim 18, wherein the first polymer layers and second polymer layers have different compositions.

20. The energy storage device of claim 17, wherein the first polymer layers or the second polymer layers exhibit a gradient in layer thickness.

\* \* \* \* \*